US012788035B2

(12) United States Patent
Lee et al.

(10) Patent No.: US 12,788,035 B2
(45) Date of Patent: Nov. 10, 2026

(54) GLUTINOUS RICE CAKE COMPOSITION AND METHOD FOR MANUFACTURING THE SAME

(71) Applicant: BAEKNYEONHWAPYEON CO., LTD., Seoul (KR)

(72) Inventors: Jo Woo Lee, Seoul (KR); Jung Wan Lee, Seoul (KR)

(73) Assignee: BAEKNYEONHWAPYEON CO., LTD., Seoul (KR)

( * ) Notice: Subject to any disclaimer, the term of this patent is extended or adjusted under 35 U.S.C. 154(b) by 232 days.

(21) Appl. No.: 18/767,227

(22) Filed: Jul. 9, 2024

(65) Prior Publication Data

US 2025/0031730 A1 Jan. 30, 2025

(30) Foreign Application Priority Data

Jul. 28, 2023 (KR) ........................ 10-2023-0098818

(51) Int. Cl.
*A23L 7/126* (2016.01)
*A23L 19/10* (2016.01)
*A23L 33/105* (2016.01)
*A23L 33/125* (2016.01)

(52) U.S. Cl.
CPC ............. *A23L 7/126* (2016.08); *A23L 19/115* (2016.08); *A23L 33/105* (2016.08); *A23L 33/125* (2016.08)

(58) Field of Classification Search
CPC ...... A23L 7/126; A23L 33/105; A23L 33/125; A23L 19/115
USPC .......................................................... 426/618
See application file for complete search history.

(56) References Cited

FOREIGN PATENT DOCUMENTS

| | | | | | |
|---|---|---|---|---|---|
| KR | 10-0334248 | B1 | | 5/2002 | |
| KR | 101063000 | B1 | * | 9/2011 | ............... A23L 7/10 |
| KR | 10-1520933 | B1 | | 5/2015 | |
| KR | 10-2016-0101642 | A | | 2/2018 | |
| KR | 10-2019-0141280 | A | | 12/2019 | |
| KR | 10-2023-0026639 | A | | 3/2024 | |
| KR | 10-0017866 | A | | 3/2026 | |

OTHER PUBLICATIONS

"Artemisia dubia," International Plant Names Index. Published on the Internet: http://www.ipni.org, The Royal Botanic Gardens, Kew, Harvard UniversityHerbaria & Libraries and Australian National Herbarium. [Retrieved Jul. 15, 2026].
"How do I style genus and species names, such as *Homo sapiens*, in MLA style?" MLA Style Center. Published on Mar. 6, 2019: https://style.mla.org/styling-genus-and-species-names/. [Retrieved Jul. 19, 2026].

(Continued)

*Primary Examiner* — Brent T O'Hern
(74) *Attorney, Agent, or Firm* — MEDLER FERRO WOODHOUSE & MILLS PLLC

(57) ABSTRACT

The present invention provides a health-friendly glutinous rice cake and a method for manufacturing the same using natural raw materials only without any additive, specifically, the present invention provides a glutinous rice cake composition which includes: grains such as glutinous rice and *Phellinus linteus*-glutinous brown rice; nuts such as walnuts, sunflower seeds and pumpkin seeds; sugar such as unrefined cane sugar; *Artemisia dubia* Wall; chick peas; and refined salt, as well as a method for manufacturing the same.

10 Claims, 2 Drawing Sheets

(56) References Cited

OTHER PUBLICATIONS

Kwak et al., "Physicochemical Properties and Determination of Key Instrumental Quality Measurement Parameters of Frozen-Cooked Rice by Correlating Consumer Acceptance," Journal of Food Quality 38:192-200 (2015).

"Phellinus linteus," Published on the USDA Animal and Plant Health Inspection Services, U.S. Department of Agriculture website: https://acir.aphis.usda.gov/s/cird-taxon/a0ut0000002iHIrAAM/phellinus-linteus. [Retrieved Jul. 19, 2026].

* cited by examiner

Nutrition Information

| Nutrients | Content/100 g |
|---|---|
| Calories | 380 kcal |
| Calcium | 214.2 mg |
| Potassium | 355.4 mg |
| Magnesium | 64.8 mg |
| Iron | 0.95 mg |
| Fat | 0 mg |
| -Saturated fat | 0 mg |
| -Trans fat | 0 mg |

GLUTINOUS RICE CAKE COMPOSITION AND METHOD FOR MANUFACTURING THE SAME

CROSS REFERENCE TO RELATED APPLICATIONS

This application claims the benefit of Korean Patent Application No. 10-2023-0098818 filed on Jul. 28, 2023, the entirety of which is incorporated by reference herein.

BACKGROUND OF THE INVENTION

1. Field of the Invention

The present invention relates to a glutinous rice cake composition and a method for manufacturing the same, more particularly, to a health-friendly glutinous rice cake composition using natural raw materials only without any additive, and a method of manufacturing the glutinous rice cake composition.

2. Description of the Related Art

Rice cake is a food prepared by grinding a major material, that is, grains such as rice, kneading the same with water, and steaming the dough. According to the cooking method and types of the rice, different tastes and textures are obtained. Recently, with increased interest in health of modern people and increase of preference to slow foods and/or additive-free products, glutinous rice cake has grown in popularity as a breakfast meal replacement and/or healthy snack.

The glutinous rice cake is made of glutinous rice, i.e., sticky rice, by immersing the glutinous rice in water, heating and steaming, the rice, adding impact, that is, repeatedly pounding to become sufficiently sticky or glutinous, and then cutting the sticky product into predetermined sizes and shapes. The glutinous rice cake is also easily staled in common other rice cakes, and has low storage and a demerit of being rapidly harden over time thus to deteriorate quality. However, glutinous rice cake is relatively easier to make than other rice cakes, and has a merit of being easily produced in desired shapes and sizes.

Among prior arts in regard to glutinous rice cake, a method for manufacturing glutinous rice cake using non-glutinous rice and tapioca alpha starch (patent document 1), a method for manufacturing glutinous rice cake and the glutinous rice cake produced by the same (patent document 2), etc. have been known. However, such prior arts use raw materials processed by processes such as grinding, heating and/or extraction, which is not health-friendly.

PRIOR ART DOCUMENT

Patent Document (Patent Document 1) Korean Patent Registration No. 10-1063000

(Patent Document 2) Korean Patent Registration No. 10-1520933

SUMMARY OF THE INVENTION

An object of the present invention is to provide a health-friendly glutinous rice cake composition using natural raw materials only without any additive.

Another object of the present invention is to provide a method for manufacturing a health-friendly glutinous rice cake composition using natural raw materials only without any additive.

However, the technical problem to be achieved by the present invention is not limited to the problems described above, and other problems not described above will be clearly understood by those skilled in the art from the following descriptions.

In order to achieve the above objects, the present invention provides a glutinous rice cake composition including grains, *Artemisia dubia* Wall, nuts, beans, sugar and refined salt, wherein the grains include glutinous rice, and *Phellinus linteus*-glutinous brown rice obtained by inoculating germinated glutinous brown rice with *Phellinus linteus* and incubating the same, wherein the nuts include walnuts, sunflower seeds and pumpkin seeds, wherein the sugar is unrefined cane sugar, and wherein the beans are chick peas.

In one embodiment of the present invention, wherein the glutinous rice cake composition may have a stickiness of 90 gw/cm$^2$ or more, which is a value measured using a tensipresser, wherein the value measured using the tensipresser may be obtained by weighing cooked rice by 10 g, pressing and shaping the same in a sample cup, leaving the shaped product in door for 2 minutes, mounting the product on a device provided with a probe having a contact area of 25 mm$^2$, and first pressing the product to 25% of a thickness and then again pressing the product with 90% pressure, wherein a weight of the largest cell is 10 kg and the measuring is executed at a measurement rate of 2 mm/s.

In one embodiment of the present invention, the glutinous rice may further include konjac rice.

In one embodiment of the present invention, wherein the unrefined cane sugar may include minerals consisting of calcium, potassium, magnesium and iron, and wherein the unrefined cane sugar may have calories in a range of 375 to 385 kcal/100 g.

In one embodiment of the present invention, the composition may include 30 to 50 parts by weight ('wt. parts') of *Artemisia dubia* Wall, 50 to 70 wt. parts of nuts, 5 to 15 wt. parts of beans, 1 to 10 wt. parts of sugar and 1 to 5 wt. parts of refined salt based on 100 wt. parts of grains.

In one embodiment of the present invention, the grains may include glutinous rice and *Phellinus linteus*-glutinous brown rice which are mixed in a weight ratio of 100:1 to 5.

In order to achieve the above objects, the present invention provides a method for manufacturing a glutinous rice cake composition, which includes: (a) immersing grains, which are *Phellinus linteus*-glutinous brown rice obtained by inoculating *Phellinus linteus* on glutinous rice and germinated glutinous brown rice, incubating the same, in water to keep the grains soaked therein, and then washing the soaked grains; (b) adding sugar and refined salt to the washed grains, and grinding the mixture, wherein the sugar is unrefined cane sugar; (c) adding beans and pumpkin seeds to the ground product as a resultant product of step (b), steaming the same, and then maintaining the product temperature, wherein the beans are chick peas; (d) adding *Artemisia dubia* Wall and nuts, which are walnuts and sunflower seeds, to the steamed product while keeping the product temperature, and then punching the mixture; and (e) shaping and cutting the punched product.

In one embodiment of the present invention, the steaming may be conducted at a temperature of 90 to 100° C., preferably, 93 to 97° C. for 10 to 20 minutes, preferably 13 to 17 minutes, and the product temperature may be 95° C. or higher.

In one embodiment of the present invention, the punching may be conducted by steam-punching for 3 to 5 minutes.

In one embodiment of the present invention, after soaking the grains in step (a), konjac rice may be further added to the grains, and then washing the mixture.

In one embodiment of the present invention, 30 to 50 wt. parts of *Artemisia dubia* Wall, 50 to 70 wt. parts of nuts, 5 to 15 wt. parts of beans, 1 to 10 wt. parts of sugar, and 1 to 5 wt. parts of refined salt may be added in the composition based on 100 wt. parts of grains, and wherein the grains may include glutinous rice and *Phellinus linteus*-glutinous brown rice which are mixed in a weight ratio of 100:1 to 5.

According to the present invention, a health-friendly glutinous rice cake composition using natural raw materials only without any additive, and a method for manufacturing the same may be advantageously provided.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
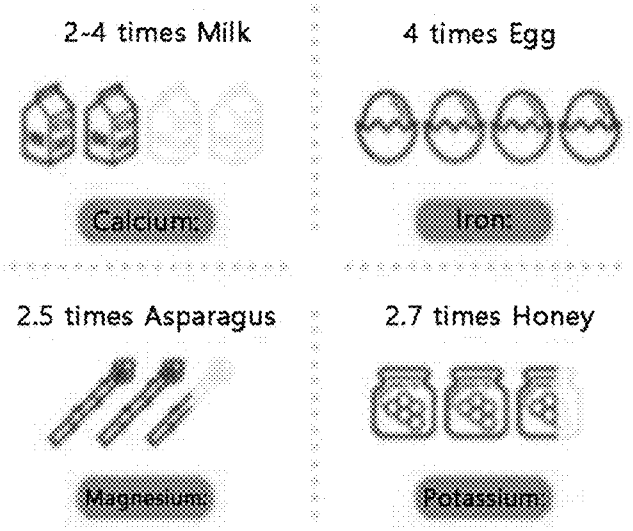
FIG. 1 illustrates mineral nutrients of unrefined cane sugar included in a glutinous rice cake composition of the present invention.

A first embodiment of the present invention relates to a glutinous rice cake composition including grains, *Artemisia dubia* Wall, nuts, beans, sugar and refined salt, wherein the grains include glutinous rice, and *Phellinus linteus*-glutinous brown rice obtained by inoculating germinated glutinous brown rice with *Phellinus linteus* and incubating the same, wherein the nuts include walnuts, sunflower seeds and pumpkin seeds, wherein the sugar is unrefined cane sugar, and wherein the beans are chick peas.

The glutinous rice included in the glutinous rice cake composition of the present invention may have a stickiness of 90 $gw/cm^2$ or more, preferably 90 to 95 $gw/cm^2$, more preferably 90 to 91 $gw/cm^2$, which is a value measured using a tensipresser, wherein the value measured using the tensipresser may be obtained by weighing cooked rice by 10 g, pressing and shaping the same in a sample cup, leaving the shaped product in door for 2 minutes, mounting the product on a device provided with a probe having a contact area of 25 $mm^2$, and first pressing the product to 25% of a thickness and then again pressing the product with 90% pressure, wherein a weight of the largest cell is 10 kg and the measuring is executed at a measurement rate of 2 mm/s.

Examples of the glutinous rice satisfying the above conditions may include 'Baekokchapssal (white jade glutinous rice)' available from Noeun rice mill in Korea, but they are not limited thereto.

The glutinous rice included in the glutinous rice cake composition of the present invention preferably further includes konjac rice. When a desired amount of konjac rice is added to glutinous rice, aging of rice cake may be prevented while maintaining the stickiness of the rice cake thus to attain effects of delaying a hardening time of the rice cake.

The konjac rice may be included in an amount of 1 to 10 wt. parts based on 100 wt. parts of glutinous rice. If the konjac rice is less than 1 wt. part based on 100 wt. parts of glutinous rice, anti-aging effect on the rice cake cannot be attained. If the content thereof exceeds 10 wt. parts, anti-aging effect on the rice cake is not further increased, hence causing a problem of decreased productivity.

The *Phellinus linteus*-glutinous brown rice included in the glutinous rice cake composition of the present invention is obtained by inoculating *Phellinus linteus* on germinated glutinous brown rice and then incubating the same, wherein conditions for germination of the germinated glutinous brown rice may include immersing the glutinous brown rice at 18 to 20° C. for 5 to 15 hours to geminate the rice. The germination may be performed, for example, for 1 to 3 hours by scooping out the rice after immersion and spraying 0.001 to 0.1% green tea extract containing 300 to 3,000 ppm of chitosan at 15 to 25° C., but it is not limited thereto.

The culture conditions may include sterilizing the germinated glutinous brown rice and then incubating the same at 18 to 30° C., preferably 20 to 25° C. for 7 to 20 days, preferably 10 to 15 days. Here, the sterilization may include sterilizing the germinated glutinous brown rice in an autoclave at 121° C. for 30 minutes, but it is not limited thereto.

*Phellinus linteus* is perennial mushroom mycelia, which is rich in beta-glucan polysaccharides, and has medical effects such as anticancer, immune-activity, anti-oxidative activity, etc., therefore, is mostly used for medicinal purpose rather than edible use.

The *Phellinus linteus*-glutinous brown rice includes a beta-glucan component more than 7 times and GABA component more than 5 times higher than those in *Phellinus linteus*, in addition, is high in an ergosterol component not contained in *Phellinus linteus*, such that it can express more excellent anticancer, anti-inflammatory and anti-allergic effects than *Phellinus linteus*.

The grains, that is, the *Phellinus linteus*-glutinous brown rice may be included in an amount of 1 to 5 wt. parts based on 100 wt. parts of glutinous rice. If the *Phellinus linteus*-glutinous brown rice is included in less than 1 wt. part based on 100 wt. parts of glutinous rice, the amount is too small to attain desired purposes of using *Phellinus linteus*-glutinous brown rice. When the *Phellinus linteus*-glutinous brown rice is included in more than 5 wt. parts, effects of using *Phellinus linteus*-glutinous brown rice are quite insignificant and involves a problem of not being desirable in an economic aspect.

The *Artemisia dubia* Wall (often referred to as wormwood) included in the glutinous rice cake composition of the present invention is usually eaten in such a way that wormwood buds (or shoots) in early spring are gathered and admixed with rice powder to make wormwood rice cake or the buds only are seasoned and eaten. Specifically, the wormwood grown on the seashore, preferably tender shoots of *Artemisia dubia* Wall grown with a sea breeze in Jejudo island are recommended.

The wormwood may be included in an amount of 30 to 50 wt. parts, preferably 35 to 45 wt. parts based on 100 wt. parts of grains. If the wormwood is included in an amount of less than 30 wt. parts, the amount is too small to attain desired purposes of using *Artemisia dubia* Wall. When the wormwood is included in more than 50 wt. parts, increase in effects of using *Artemisia dubia* Wall is quite insignificant and involves a problem of not being desirable in an economic aspect.

The nuts included in the glutinous rice cake composition of the present invention may include walnuts, sunflower seeds and pumpkin seeds. The walnuts are rich in unsaturated fatty acids and a food ingredient good for brain health and skin. In addition, the sunflower seeds are fruits of sunflower and rich in unsaturated fatty acids thus to reduce a cholesterol level, and are also rich in phytosterol as a vegetable sterol component and thus advantageous for prevention of various adult diseases.

Further, the pumpkin seeds contain unsaturated fatty acid, which reduces a blood cholesterol level and is helpful for preventing adult diseases such as hypertension. Furthermore, the pumpkin seeds are rich in minerals and vitamins, thus to be known as a food beneficial for skin care, aging prevention and even eyesight recovery.

The nuts may further include one or more selected from the group consisting of peanuts, pine nuts, gingko nuts, almonds, macadamia, pistachio, pecan, cashew nuts, etc., but they are not limited thereto.

The *Cicer arietinum* (often referred to as chick peas) included in the glutinous rice cake composition of the present invention is rich in carbohydrates, thus to have high calories (361 kcal/1509 kJ per 100 g). Further, protein, phosphorus, calcium, iron and vitamin B9 are also contained abundantly, and it is known to express therapeutic effects in bronchitis, cholera, constipation, diarrhea, indigestion, abdominal distension, sunstroke, etc.

The chick peas may be included in an amount of 5 to 15 wt. parts, preferably 8 to 12 wt. parts based on 100 wt. parts of grains. If the chick peas are included in less than 5 wt. parts, the amount is too small to attain desired purposes of using the chick peas. When the chick peas are included in more than 15 wt. parts, increase in effects of using the chick peas is quite insignificant and involves a problem of not being desirable in an economic aspect.

Meanwhile, in the case of using a refined sweetener such as sugar, it is quickly digested and rapidly decomposed to make the blood more sticky, which in turn fastly increases a blood sugar level. This would excessively secrete insulin to drop the blood sugar level off. If sugar (simple carbohydrate) to be fastly digested and depleted is taken too much or a meal with a lack of fiber is taken for a long time, the brain cannot receive stable supply of desired fuel (that is, nutrient) and thus entail a problem of not normally performing brain function.

Further, the body is continuously in an excessive acidic condition, therefore, in order to recover acid-base balance, minerals have been more increasingly used, and hypocalcia (lack of calcium) symptoms may occur. When a refined sweetener such as sugar is taken too much, the liver cannot degrade it and have a problem of causing a fatty liver.

Therefore, the glutinous rice cake of the present invention uses unrefined cane sugar rather than refined white sugar, specifically, Colombian sugar cane grown at a sea level altitude of 2,000 m or higher, which is managed through contract cultivation is preferably recommended.

The unrefined cane sugar may contain minerals including calcium, potassium, magnesium and iron, wherein the calcium may range from 2100 to 2200 mg/100 g, the potassium may range from 350 to 360 mg/100 g, the magnesium may range from 60 to 70 mg/100 g, and the iron may range from 0.9 to 1.0 mg/100 g, which are mineral contents corresponding to 2 to 4 times milk, about 4 times egg, about 2.5 times asparagus, and about 2.7 times honey. FIG. 1 illustrates mineral nutrients of the unrefined cane sugar included in the glutinous rice cake composition of the present invention.

Further, calories of the unrefined cane sugar may range from 375 to 385 kcal/100 g, preferably 380 kcal/100 g, but they are not limited thereto.

The unrefined cane sugar may be included in an amount of 1 to 10 wt. parts, preferably 1 to 5 wt. parts based on 100 wt. parts of grains. If the unrefined cane sugar is included in less than 1 wt. part, the amount is too small to attain desired purposes of using the sugar. When the unrefined cane sugar is included in more than 10 wt. parts, increase in effects of using the chick peas is quite insignificant and involves a problem of not being desirable in an economic aspect.

The glutinous rice cake composition of the present invention may include 1 to 5 wt. parts, preferably 1 to 3 wt. parts of refined salt (or white salt) based on 100 wt. parts of grains. If the white salt is included in less than 1 wt. part, the amount is too small to attain desired purposes of using the salt. When the white salt is included in more than 5 wt. parts, the amount of salt is too large and involves a problem of not being health oriented.

The grains included in the glutinous rice cake composition of the present invention may include glutinous rice and *Phellinus linteus*-glutinous brown rice which are mixed in a weight ratio of 100:1 to 5, preferably 100:1 to 3. If the grains are mixed in a weight ratio of less than 100:1, the amount of *Phellinus linteus*-glutinous brown rice is too small to attain desired purposes of using the *Phellinus linteus*-glutinous brown rice. When the grains are mixed in a weight ratio of more than 100:5, the amount of *Phellinus linteus*-glutinous brown rice is too much and involves a problem of having bad effects on sensory functions.

The weight ratio of grains:*Artemisia dubia* Wall:nuts included in the glutinous rice cake composition of the present invention is preferably 5:2:3, but it is not limited thereto.

Further, the glutinous rice cake composition of the present invention may further include hemp seeds and genistin as anti-oxidative compounds.

The glutinous rice cake composition of the present invention may include 0.1 to 5 wt. parts of hemp seeds and genistin as anti-oxidative compounds based on 100 wt. parts of grains. If the above content is less than 0.1 wt. part, desired anti-oxidative effects could not be demonstrated. When the content thereof exceeds 5 wt. parts, increase in effects of using the anti-oxidative compounds is quite insignificant and involves a problem of not being desirable in an economic aspect.

Hemp seeds used as the anti-oxidative compound are seeds of hemp, which is an annual plant in the family Cannabaceae, and refer to an edible state after removing a hallucinogenic compound existing in the husk of hemp, Tetrahydrocanabinol (THC). Hemp seeds are originated from the central Asia and now being cultivated in different areas over the world.

Hemp seeds have nuttiness and soft texture to exhibit taste similar to other nuts, are nutritionally excellent due to high contents of protein, essential amino acids and minerals. Further, because of high fat content (25 to 35%), hemp seeds are also used as an edible oil (or cooking oil) through pressing and extraction. Further, the hemp seed oil is rich in polyunsaturated fatty acid such as alpha-linolenic acid (ALA), gamma-linolenic acid (GLA), etc., and thus is known to have excellent effects such as cholesterol reduction, alleviation of vascular inflammation, and reduction of skin diseases and/or atopic dermatitis.

Meanwhile, hemp seed is called "mazain (or maziren)" in the oriental medicine field, is used for intractable constipation, diabetes, various pain diseases, menoxenia, skin diseases and dysentery, and recently well known to have neuroinflammation inhibition and neuroprotection activity, etc.

Researches relevant to hemp seed known in the art include, for example, Fatty acid analysis (Koh, D H, 1990, Korean J Food Nutr 3:201-206), Anti-oxidative activity peptide in hemp seed (Lu R R, et al., 2010. Food Chem 123:1210-1218), Anti-hypertensive peptide (Girgih A T et al., 2014. J. Funct Foods 6:384-394), and Anti-neuroinflammation and neuroprotection activity (Zhou Y et al, 2018. Phytochem Lett 23:57-61) and the like.

Further, Improvement of cognitive function by hemp seed intake (Bae, G. J. et al., 2015, Journal of Korean Medicine Rehabilitation 25:1-15) and Alleviation of atopic dermatitis (Pak, S. H., 2018, Chosun Univ. Ph.D. Thesis) are also known. Hemp seed has nuttiness and soft texture to exhibit taste similar to other nuts, are nutritionally excellent due to high contents of protein, essential amino acids and minerals. Further, because of high fat content (25 to 35%), hemp seed is also used as an edible oil through pressing and extraction.

Further, the hemp seed oil is rich in polyunsaturated fatty acid such as alpha-linolenic acid (ALA), gamma-linolenic acid (GLA), etc. and thus is known to have excellent effects such as cholesterol reduction, alleviation of vascular inflammation, and reduction of skin disease and atopic dermatitis.

Furthermore, although platelet coagulation inhibitory activity in rat when hemp seeds are fed as a diet in relation to thrombosis has been reported (Richard M N et al., 2007, Journal of thrombosis and haemostasis, 5:424-425), this result is known to be accomplished by polyunsaturated fatty acids such as linoleic acid (LA) and alpha-linolenic acid (ALA) in the hemp seed.

The hemp seed possibly included in the glutinous rice cake composition of the present invention may be a powdery formulation, but it is not limited thereto. If necessary, it may also be modified into any formulation commonly available in the art.

With respect to the glutinous rice cake composition according to the present invention, genistin used as an anti-oxidative compound is a bright yellow dye belonging to isoflavone included in many plants such as beans, kudzu, etc., for example, is contained at 0.15% in the beans.

The genistin is chemically in the form of 7-O-beta-D-glucoside of genistein, which is the major form of isoflavone naturally occurring in the plant. About 99% of isoflavonoid compound contained in beans is present as glucoside. The glucoside is converted by digestive enzymes in a digestive system to express biological effects. Further, since genistin is converted into more familiar type of genistin, the biological activities including anti-atherogenic, estrogenic and anti-cancer effects are substantially similar to each other.

The glutinous rice cake composition according to the present invention may include 0.1 to 5 wt. parts of genistin and hemp seeds as anti-oxidative compounds based on 100 wt. parts of boiled glutinous rice water. If the content thereof is less than 0.1 wt. part, desired anti-oxidative effects are not expressed. When the content thereof exceeds 5 wt. parts, increase in anti-oxidative effects is quite insignificant and involves a problem of not being desirable in an economic aspect.

The glutinous rice cake composition according to the present invention may include hemp seeds and genistin mixed in a weight ratio of 1:0.5 to 3, preferably 1:1, as anti-oxidative compounds. If the content of the anti-oxidative compound is beyond the above weight ratio, desired purposes for providing the glutinous rice cake composition could not be attained, or it may cause a problem of increasing production costs whereas not further increasing anti-oxidative activity.

The glutinous rice cake composition of the present invention includes both of hemp seeds and genistin as anti-oxidative compounds, such that anti-oxidative effects become synergistic, compared to the case of including the anti-oxidative compounds separately, thereby providing a health-oriented glutinous rice cake composition.

A second embodiment of the present invention relates to a method for manufacturing a glutinous rice cake composition, including: (a) immersing grains, which are *Phellinus linteus*-glutinous brown rice obtained by inoculating *Phellinus linteus* on glutinous rice and germinated glutinous brown rice, incubating the same, in water to keep the grains soaked therein, and then washing the soaked grains; (b) adding sugar and refined salt to the washed grains, and grinding the mixture, wherein the sugar is unrefined cane sugar; (c) adding beans and pumpkin seeds to the ground product as a resultant product of step (b), steaming the same, and then maintaining the product temperature, wherein the beans are chick peas; (d) adding *Artemisia dubia* Wall and nuts, which are walnuts and sunflower seeds, to the steamed product while keeping the product temperature, and then punching the mixture; and (e) shaping and cutting the punched product.

Figure 2:
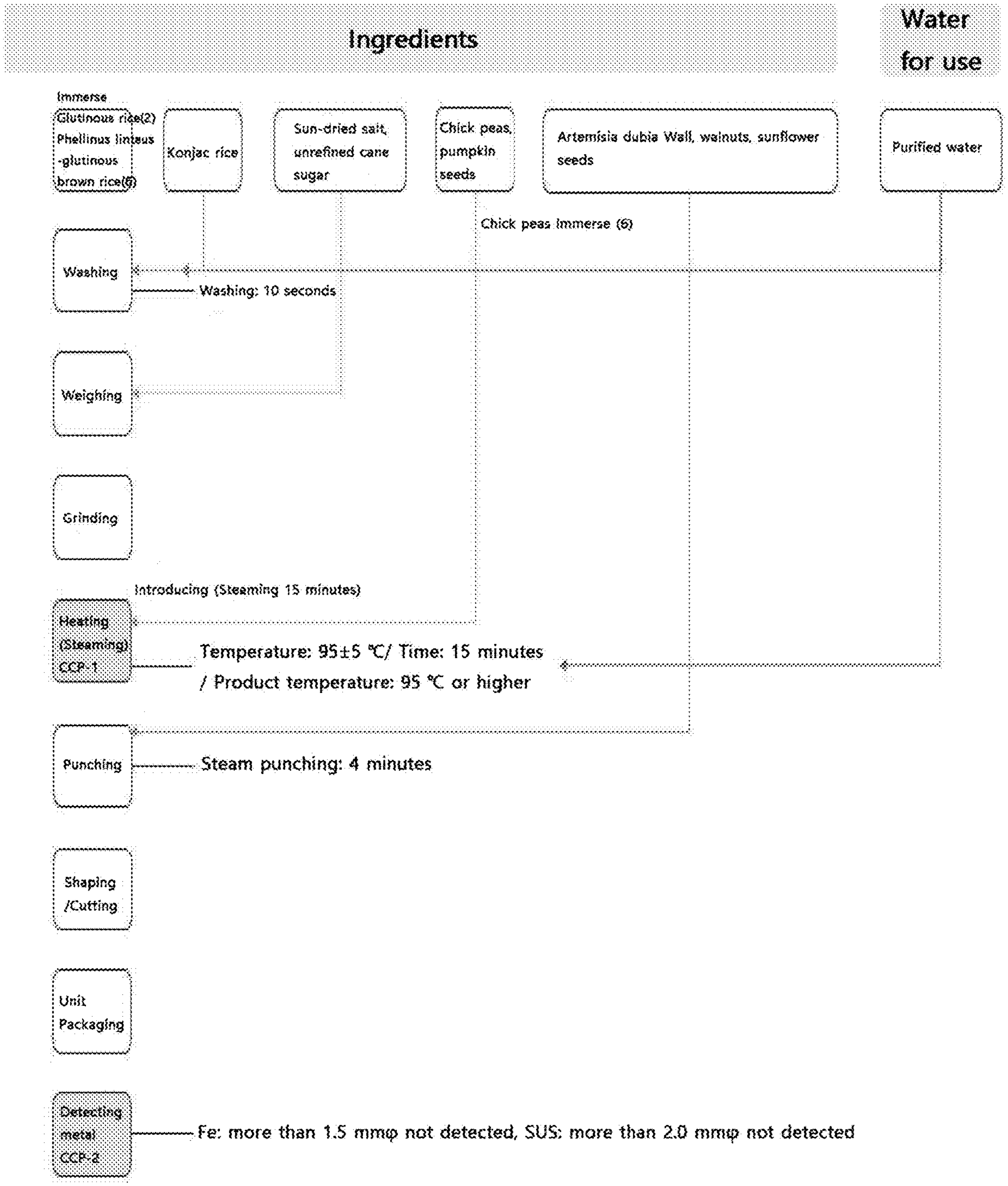
FIG. 2 is a flow diagram illustrating a manufacturing process of the glutinous rice cake composition according to the present invention.

FIG. 2 is a flow diagram illustrating a process of manufacturing the glutinous rice cake composition according to the present invention.

The steaming may be conducted at a temperature of 90 to 100° C., preferably 93 to 97° C. for 10 to 20 minutes, preferably 13 to 17 minutes, while the product temperature is preferably maintained at 95° C. or higher.

The punching may be conducted by steam-punching for 3 to 5 minutes, preferably for 4 minutes, but it is not limited thereto. The steam-punching may be performed by punching the steam product to which the nuts are added by means of a steam-puncher to generate pores inside the mixture and continuously punching until it has sufficient viscosity, but it is not limited thereto.

In the method for manufacturing a glutinous rice cake composition of the present invention, after soaking the grains in step (a), konjac rice may be further added to the grains, and then washing the mixture, but it is not limited thereto. The stickiness of the glutinous rice cake is maintained while preventing aging of the rice cake by introducing a desired amount of konjac rice into glutinous rice, thereby attaining effects of delaying a hardening time of the rice cake.

In the method for manufacturing a glutinous rice cake composition of the present invention, 30 to 50 wt. parts, preferably 35 to 45 wt. parts of *Artemisia dubia* Wall, 50 to 70 wt. parts, preferably 55 to 65 wt. parts of nuts, 5 to 15 wt. parts, preferably 8 to 12 wt. parts of beans, 1 to 10 wt. parts, preferably 1 to 5 wt. parts of sugar, and 1 to 5 wt. parts of refined salt may be added in the composition based on 100 wt. parts of grains.

Further, the grains may include glutinous rice and *Phellinus linteus*-glutinous brown rice which are mixed in a weight ratio of 100:1 to 5, preferably 100:1 to 3. If these grains are mixed in a weight ratio of less than 100:1, the amount of *Phellinus linteus*-glutinous brown rice is too small to attain desired purposes of using the same. When the grains are mixed in a weight ratio of more than 100:5, the amount of *Phellinus linteus*-glutinous brown rice is too much and involves a problem of having bad effects on sensory functions.

The method for manufacturing a glutinous rice cake composition of the present invention may further include shaping and cutting the product, specifically, the punched product may be shaped using a molding machine, and in order to prevent aging of the surface, vegetable oil is added to the surface to form a film, followed by cutting the same in a desired size using a cutter, but it is not limited thereto.

The method for manufacturing a glutinous rice cake composition of the present invention may further include unit packaging the cut glutinous rice cake composition, followed by metal detection. In the metal detection, it is important to monitor the product like it is according to a critical limit set to each CCP process, and when there is a deviation from the critical limit, to take a corrective action. The critical limit may be defined as Fe: more than 1.5 mmφ not detected, SUS: more than 2.0 mmφ not detected, but it is not limited thereto.

The grains, *Artemisia dubia* Wall, nuts, beans, sugar, refined salt and anti-oxidative compounds used in the method for manufacturing a glutinous rice cake composition have already been described in the first embodiment above, therefore will not be described in detail.

Hereinafter, the present invention will be described in detail by way of examples and experimental examples.

However, the following examples and experimental examples are merely illustrative of the present invention, and the content of in the present invention, it is not limited to the following examples and experimental examples.

<Example 1> Preparation of Glutinous Rice Cake Composition (1)

As grains, 97 wt. parts of glutinous rice including 5 wt. parts of konjac rice, and 3 wt. parts of *Phellinus linteus*-glutinous brown rice obtained by inoculating *Phellinus linteus* on the germinated glutinous brown rice and incubating the same (Cell Activation Research Institute (CARI) co., ltd.) were immersed in water for 5 hours to keep the grains soaked therein, followed by washing the grains with pure water.

5 wt. parts of unrefined cane sugar obtained using Colombian sugar cane grown at a sea level altitude of 2,000 m or higher, which is under management by a Korean company through contract cultivation, and 2.5 wt. parts of white salt were added to 100 wt. parts of the washed grains, followed by grinding the mixture.

To the ground product, 10 wt. parts of chick peas and 20 wt. parts of pumpkin seeds were added. Then, the mixture was steamed at a temperature of 95° C. for 15 minutes, the product temperature was maintained at 95 to 100° C. After then, to the steamed product with the maintained product temperature, 40 wt. parts of *Artemisia dubia* Wall, 20 wt. parts of walnut and 20 wt. parts of sunflower seeds as nuts were added. Then, after punching the mixture by a steam puncher, shaping and cutting were carried out thus to prepare a glutinous rice cake composition.

<Example 2> Preparation of Glutinous Rice Cake Composition (2)

As grains, 98 wt. parts of glutinous rice including 5 wt. parts of konjac rice, and 2 wt. parts of *Phellinus linteus*-glutinous brown rice obtained by inoculating *Phellinus linteus* on the germinated glutinous brown rice and incubating the same (Cell Activation Research Institute (CARI) co., ltd.) were immersed in water for 5 hours to keep the grains soaked therein, followed by washing the grains with pure water.

1 wt. part of unrefined cane sugar obtained using Colombian sugar cane grown at a sea level altitude of 2,000 m or higher, which is under management by a Korean company through contract cultivation, and 1.5 wt. parts of white salt were added to 100 wt. parts of the washed grains, followed by grinding the mixture.

To the ground product, 5 wt. parts of chick peas and 20 wt. parts of pumpkin seeds were added. Then, the mixture was steamed at a temperature of 95° C. for 15 minutes, the product temperature was maintained at 95 to 100° C. After then, to the steamed product with the maintained product temperature, 35 wt. parts of *Artemisia dubia* Wall, 20 wt. parts of walnut and 20 wt. parts of sunflower seeds as nuts were added. Then, after punching the mixture by a steam puncher, shaping and cutting were carried out thus to prepare a glutinous rice cake composition.

<Example 3> Preparation of Glutinous Rice Cake Composition (3)

As grains, 97 wt. parts of glutinous rice including 5 wt. parts of konjac rice, and 3 wt. parts of *Phellinus linteus*-glutinous brown rice obtained by inoculating *Phellinus linteus* on the germinated glutinous brown rice and incubating the same (Cell Activation Research Institute (CARI) co., ltd.) were immersed in water for 5 hours to keep the grains soaked therein, followed by washing the grains with pure water.

10 wt. parts of unrefined cane sugar obtained using Colombian sugar cane grown at a sea level altitude of 2,000 m or higher, which is under management by a Korean company through contract cultivation, and 4.5 wt. parts of white salt were added to 100 wt. parts of the washed grains, followed by grinding the mixture.

To the ground product, 15 wt. parts of chick peas and 20 wt. parts of pumpkin seeds were added. Then, the mixture was steamed at a temperature of 95° C. for 15 minutes, the product temperature was maintained at 95 to 100° C. After then, to the steamed product with the maintained product temperature, 35 wt. parts of *Artemisia dubia* Wall, 20 wt. parts of walnut and 20 wt. parts of sunflower seeds as nuts, and hemp seeds and genistin mixed in a weight ratio of 2:1 as anti-oxidative compounds were added. Then, after punching the mixture by a steam puncher, shaping and cutting were carried out thus to prepare a glutinous rice cake composition.

<Comparative Example 1> Preparation of Glutinous Rice Cake Composition

A glutinous rice cake composition was prepared by the same procedures as in Example 1, except that the glutinous rice not including konjac rice was used as the grains.

<Comparative Example 2> Preparation of Glutinous Rice Cake Composition Partially Lacking of Anti-Oxidative Compound (1)

A glutinous rice cake composition was prepared by the same procedures as in Example 3, except that 2.5 wt. parts of hemp seeds was mixed as the anti-oxidative compound based on 100 wt. parts of grains.

<Comparative Example 3> Preparation of Glutinous Rice Cake Composition Partially Lacking of Anti-Oxidative Compound (2)

A glutinous rice cake composition was prepared by the same procedures as in Example 3, except that 2.5 wt. parts of genistin were mixed as the anti-oxidative compound based on 100 wt. parts of grains.

<Experimental Example 1> Assessment of Sensory Function of Glutinous Rice Cake Composition The glutinous rice cake compositions prepared in Example 1, Example 2 and Comparative Example 1 were subjected to assessment of appearance modification, chromaticity change, presence or absence of unpleasant odor, and overall preference while storing the compositions at 20° C. for 1 week. Well trained panel staffs (20 persons for male and female, respectively) have evaluated the appearance modification of the compositions according to five (5)-point scale (4.0: original shape maintained; 3.5: partially modified; 3.0: more than half modified).

Further, the chromaticity change was also evaluated according to 5-point scaling (4.0 or more: dark green; 3.5 or more: normal green; 3.0 or more: light green). Likewise, both of the presence or absence of unpleasant odor and overall preference were evaluated according to 5-point scaling (4.0: good; 3.5: normal; 3.0: bad). Results thereof are shown in Table 1 below.

TABLE 1

| Section | Example 1 | Example 2 | Comparative Example 1 |
|---|---|---|---|
| Appearance modification | 4.3 | 4.2 | 3.2 |
| Chromaticity change | 4.3 | 4.3 | 3.1 |
| Presence or absence of unpleasant odor | 4.2 | 4.2 | 3.2 |
| Overall preference | 4.2 | 4.3 | 3.1 |

From the above results, it can be seen that the glutinous rice cake composition of the present invention using the grains, which consists of the glutinous rice including konjac rice, as well as *Phellinus linteus*-glutinous brown rice does not have appearance modification, chromaticity change and unpleasant odor, and show excellent overall preference.

On the other hand, it can be seen that the glutinous rice cake composition in Comparative Example 1 using only glutinous rice without konjac rice as the grains shows low levels of appearance, chromaticity, unpleasant odor and overall preference.

<Experimental Example 2> Anti-Oxidative Activity of Glutinous Rice Cake Composition To determine anti-oxidative activities (total polyphenol content, total flavonoid content, DPPH radical scavenging activity) of each of the glutinous rice cake compositions prepared in Example 3 and Comparative Examples 1 to 3, some samples were prepared and treated as follows.

Firstly, the glutinous rice cake composition was ground and extracted using an organic solvent, followed by centrifugation. Then, after filtering the supernatant, the extract was obtained and used.

The total polyphenol content was measured by Folin-Denis method. Specifically, after adding 0.1 mL of Folin-Ciocalteu's phenol reagent and 1.4 mL distilled water to 0.2 mL of sample and mixing the same, 0.3 mL of 20% $Na_2CO_3$ was added, followed by leaving the mixture in a dark room for 20 minutes, and then measuring absorbance at 765 nm. The total polyphenol content was converted and determined by a gallic acid (mM/g) standard curve, and the result of three (3) times repeated experiments is shown.

Meanwhile, a total flavonoid content was measured by the method of Shen Y, Jin L, Xiao P, Lu Y, Bao J (2009) (Total phenolics, flavonoids, antioxidant capacity in rice grain and their relations to grain color, size and weight. J Cereal Sci 49:106-111.). Specifically, after adding 0.15 mL of 5% sodium nitrite (NaNO2) to 0.5 mL of sample and leaving the mixture for 5 minutes, 0.3 mL of $AlCl_3 \cdot 6H_2O$ and 1 mL of 1 M NaOH were added thereto and admixed, followed by leaving the mixture in a dark room for 15 minutes, and then measuring absorbance at 415 nm. The above content was indicated using catechin as a standard substance.

Scavenging activity to 2,2-diphenyl-1-picryl-hydrazyl-hydrate (DPPH) radical ("DPPH radical scavenging activity") was determined by modifying the method of Brand-Williams W, Cuvelier M E, Berset C (1995) (Use of free radical method to evaluate antioxidant activity. Lebenson Wiss Technol 28:25-30.). Specifically, after adding 0.2 mL of sample to 1 mL of 0.2 mM DPPH solution dissolved in 70% ethanol and mixing the same well, the mixture was left in a dark room at room temperature for 30 minutes, followed by measuring absorbance at 517 nm. The scavenging activity is calculated by the following equation and exhibited in percentage.

$$\text{DPPH radical scavenging activity (\%)}=(A-B)/A\times 100$$

(A: Control absorbance, B: Sample absorbance)

2,2'-azino-bis-3-ethylbenzo-thiazoline-6-sulfonic acid (ABTS) radical scavenging activity was determined by the method of Pellegrin et al. (1998), which measures the radical scavenging activity after diluting the sample in 10-fold distilled water (Sigma-Aldrich, St. Louis, MO, USA).

ABTS 7.4 mM and potassium persulfate 2.6 mM were admixed in equal proportion and left in a dark room overnight thus to form ABTS cations. Then, the product was diluted in 1×PBS so that the absorbance at 732 nm reaches 0.70±0.02. To 190 μL of the diluted ABTS solution, 10 μL of extract sample was added and settled for 60 minutes, followed by measuring absorbance at 732 nm.

The total phenol content (mg/ml), total flavonoid content (mg/ml), DPPH radical scavenging activity (%) and ABTS radical scavenging activity (%) were listed in the following Table 2.

TABLE 2

| Section | Example 3 | Comparative Example 1 | Comparative Example 2 | Comparative Example 3 |
|---|---|---|---|---|
| Total phenol content | 66.5 | 0.8 | 25.2 | 27.7 |
| Total flavonoid | 7.9 | 0.2 | 2.1 | 2.4 |
| DPPH radical scavenging activity | 11.2 | 0.5 | 3.3 | 3.2 |
| ABTS radical scavenging activity | 12.7 | 0.4 | 4.5 | 4.0 |

From the above results, it can be seen that, compared to the glutinous rice cake composition of Comparative Example 1 which does not include an anti-oxidative compound but uses only glutinous rice without konjac rice as the grains, the glutinous rice cake composition including the anti-oxidative compound according to Example 3 shows remarkably improvements in the total phenol content, total flavonoid content, DPPH radical scavenging activity and ABTS radical scavenging activity.

Meanwhile, it can be seen that, as compared to the total value per anti-oxidative performance (total phenol content, total flavonoid content, DPPH radical scavenging activity or ABTS radical scavenging activity) of each of the glutinous rice cake compositions partially lacking the anti-oxidative compound in Comparative Examples 2 and 3, the glutinous rice cake composition according to Example 3 shows increases in the total phenol content, total flavonoid content, DPPH radical scavenging activity and ABTS radical scavenging activity, which are about 25.7%, 75.6%, 72.3% and 49.4%, respectively.

Such results as described above are presumed because both of hemp seeds and genistin as the anti-oxidative compounds are added, thus to induce synergistic effects, compared to addition of separate anti-oxidative compounds.

As such, specific portions of the subject matters in the present invention have been described in detail. Therefore, it will be obvious to those skilled in the art that the above concrete description is proposed only as preferred embodiments, however, the scope of the present invention is not limited thereto.

Accordingly, the substantial scope of the present invention will be defined by the appended claims and equivalents thereof. Simple modifications ad alterations of the present invention would be easily used by those skilled in the art, and it may be understood that such modifications or alterations are all included in the scope of the present invention.

What is claimed is:

1. A glutinous rice cake composition comprising grains, *Artemisia dubia* Wall, walnuts, sunflower seeds, pumpkin seeds, beans, sugar and refined salt, wherein the grains include glutinous rice, and *Phellinus linteus*-glutinous brown rice obtained by inoculating germinated glutinous brown rice with *Phellinus linteus* and incubating the same, wherein the sugar is unrefined cane sugar, and wherein the beans are chick peas.

2. The glutinous rice cake composition according to claim 1, wherein the glutinous rice cake composition has a stickiness of 90 $gw/cm^2$ or more, which is a value measured using a tensipresser, wherein the value measured using the tensipresser is obtained by weighing 10 g of cooked rice, pressing and shaping the same in a sample cup to form a shaped product, leaving the shaped product indoors for 2 minutes, mounting the shaped product on a tensipresser mount, wherein the tensipresser mount comprises a probe having a contact area of 25 $mm^2$, first pressing the shaped product to 25% of a thickness of the shaped product, and then again pressing the shaped product to 90% of the thickness of the shaped product, wherein a maximum tensipresser cell weight is 10 kg and the measuring is executed at a measurement rate of 2 mm/s.

3. The glutinous rice cake composition according to claim 1, wherein the glutinous rice further includes konjac rice.

4. The glutinous rice cake composition according to claim 1, wherein the unrefined cane sugar includes minerals consisting of calcium, potassium, magnesium and iron, and wherein the unrefined cane sugar has calories in a range of 375 to 385 kcal/100 g.

5. The glutinous rice cake composition according to claim 1, wherein the composition comprises 30 to 50 parts by weight ('wt. parts') of the *Artemisia dubia* Wall, 50 to 70 wt. parts of a combination of the walnuts, the sunflower seeds, and the pumpkin seeds, 5 to 15 wt. parts of the beans, 1 to 10 wt. parts of the sugar, and 1 to 5 wt. parts of the refined salt based on 100 wt. parts of the grains.

6. The glutinous rice cake composition according to claim 1, wherein the grains include the glutinous rice and the *Phellinus linteus*-glutinous brown rice which are mixed in a weight ratio of 100:1 to 5.

7. A method for manufacturing a glutinous rice cake composition, the method comprising:

(a) immersing grains, which are *Phellinus linteus*-glutinous brown rice obtained by inoculating *Phellinus linteus* on glutinous rice and germinated glutinous brown rice, incubating the same, in water to keep the grains soaked therein to form soaked grains, and then washing the soaked grains to form washed grains;

(b) adding sugar and refined salt to the washed grains to form a first mixture, and grinding the mixture to form a ground product, wherein the sugar is unrefined cane sugar;

(c) adding beans and pumpkin seeds to the ground product as a resultant product of the step (b), steaming the same to form a steamed product, and then maintaining a temperature of the steamed product, wherein the beans are chick peas;

(d) adding *Artemisia dubia* Wall, walnuts, and sunflower seeds to the steamed product to form a second mixture while maintaining a temperature of the second mixture, and then punching the second mixture to form a punched product; and (e) shaping and cutting the punched product.

8. The method according to claim 7, wherein the steaming is conducted at a temperature of 90 to 100° C. for 10 to 20 minutes, and the temperature of the steamed product is 95° C. or higher, and wherein the punching is conducted by steam-punching for 3 to 5 minutes.

9. The method according to claim 7, wherein after soaking the grains in the step (a), konjac rice is further added to the grains to form a konjac rice-containing mixture, and then washing the konjac rice-containing mixture.

10. The method according to claim 7, wherein 30 to 50 wt. parts of the *Artemisia dubia* Wall, 50 to 70 wt. parts of a combination of the walnuts, the sunflower seeds, and the pumpkin seeds, 5 to 15 wt. parts of the beans, 1 to 10 wt. parts of the sugar, and 1 to 5 wt. parts of the refined salt are added in the composition based on 100 wt. parts of the grains, and wherein the grains include the glutinous rice and the *Phellinus linteus*-glutinous brown rice which are mixed in a weight ratio of 100:1 to 5.

* * * * *